Nov. 25, 1958 C. T. BROWN 2,861,608
TENONING TOOL
Filed June 11, 1956 2 Sheets-Sheet 1
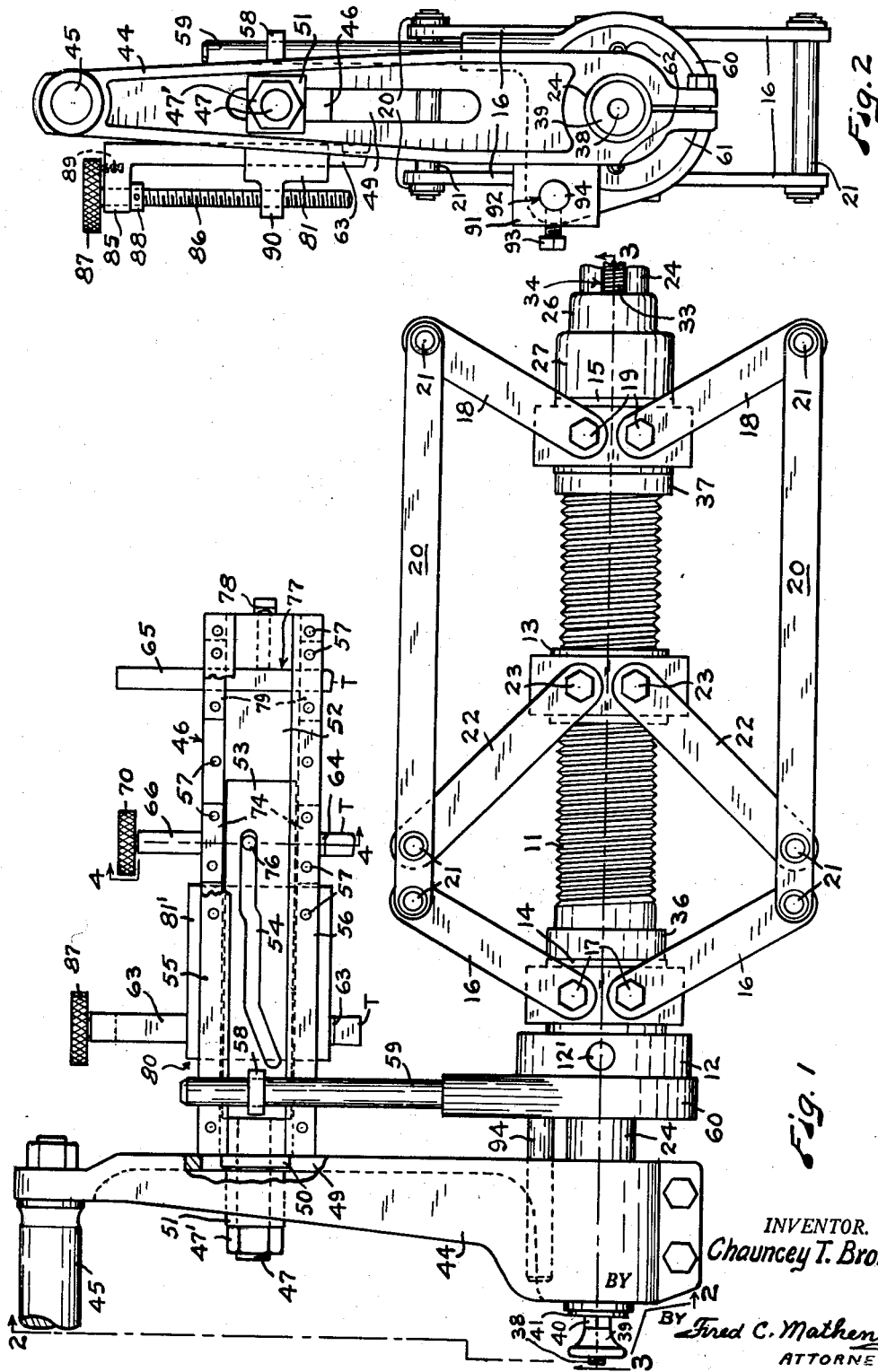
INVENTOR.
*Chauncey T. Brown*
BY *Fred C. Matheny*
ATTORNEY Nov. 25, 1958
C. T. BROWN
2,861,608
TENONING TOOL
Filed June 11, 1956
2 Sheets-Sheet 2
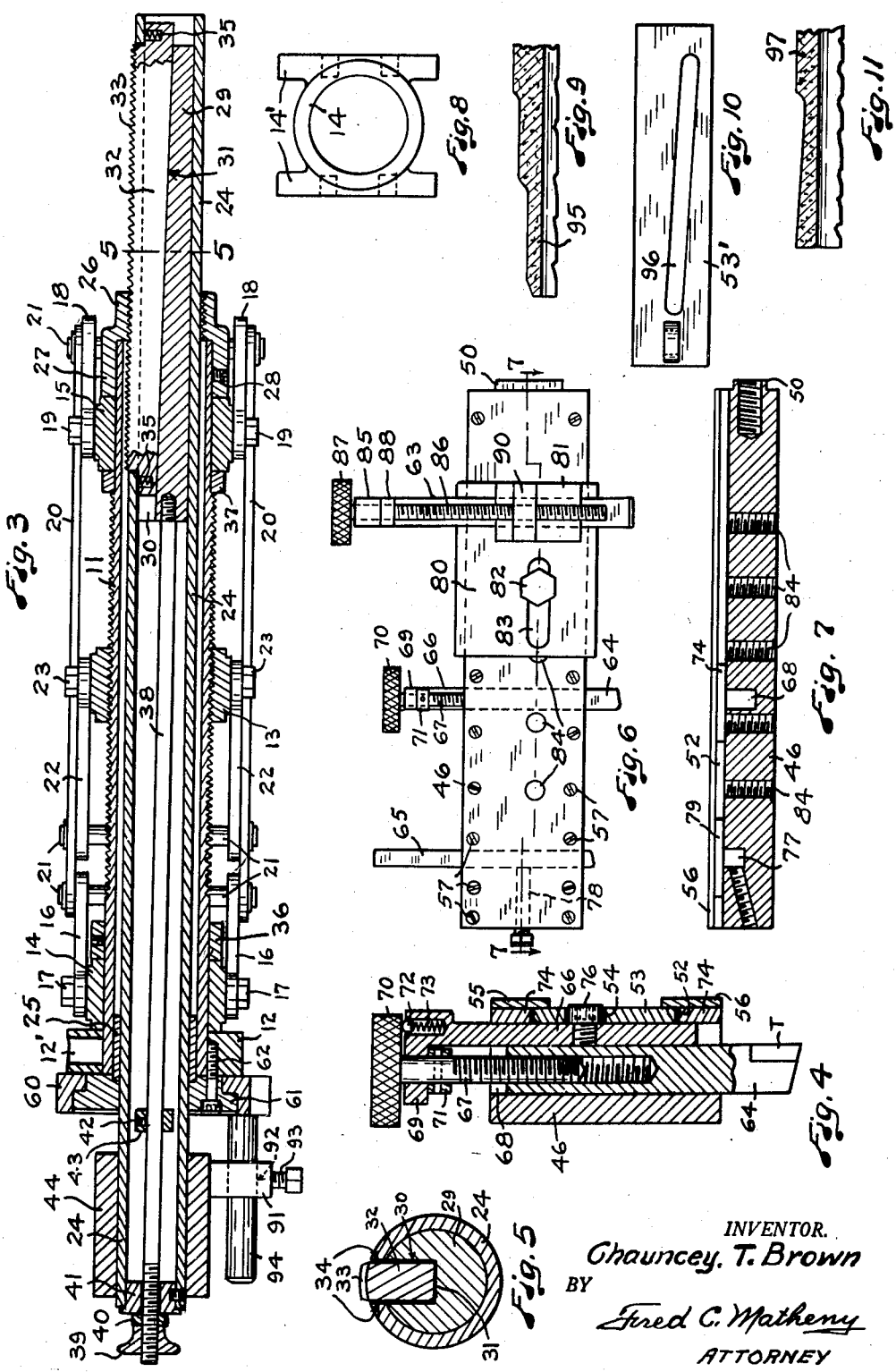
INVENTOR.
Chauncey T. Brown
BY
Fred C. Matheny
ATTORNEY

United States Patent Office 2,861,608
Patented Nov. 25, 1958

2,861,608

TENONING TOOL

Chauncey T. Brown, Seattle, Wash., assignor to Spring Load Manufacturing Corporation, Seattle, Wash., a corporation of Washington Application June 11, 1956, Serial No. 590,778

10 Claims. (Cl. 144—205)

This invention relates to a tenoning tool for machining the ends of asbestos-cement or wood pipe to facilitate making pipe joints.

An object of this invention is to provide a portable tenoning tool of light weight which can be applied to a pipe on the job and wherever the pipe is located and used to machine and accurately shape the end of the pipe to a close tolerance, the tool being particularly well adapted for use on pipes of asbestos-cement, wood or like material which ordinarily is not joined by threaded couplings.

Another object is to provide a tenoning tool which is simple in construction, not expensive to manufacture, reliable and efficient in operation and one which can be easily handled and operated by one man and is applicable to pipes over a wide range of varying sizes.

Another object is to provide a pipe tenoning tool having a tool holder movable along a pipe and having cam means in the tool holder capable of radially moving a tool to shape a pipe to a predetermined contour as said tool is simultaneously rotated around the pipe and moved longitudinally of the pipe.

Another object is to provide a pipe tenoning tool having selectively engageable and disengageable feed means of novel and efficient construction capable of feeding a tool longitudinally along a pipe as said tool is rotated around the pipe.

Other objects of this invention will be apparent from the following description taken in connection with the accompanying drawings.

In the drawings Figure 1 is an elevation of a tenoning tool constructed in accordance with this invention, parts being broken away.

Fig. 2 is an end view looking in the direction of broken line 2—2 of Fig. 1.

Fig. 3 is a longitudinal sectional view taken substantially on broken line 3—3 of Fig. 1.

Fig. 4 is a sectional view on a larger scale than the preceeding figures taken substantially on broken line 4—4 of Fig. 1 and showing an adjustable tenoning tool.

Fig. 5 is an enlarged view in cross section taken substantially on broken line 5—5 of Fig. 3.

Fig. 6 is a detached view in elevation showing the rear side of a tool carrying arm.

Fig. 7 is a longitudinal sectional view of the tool carrying arm taken substantially on broken line 7—7 of Fig. 6, the tools and cam plate being removed therefrom.

Fig. 8 is a detached elevation of a collar used in connection with this invention.

Fig. 9 is a sectional view showing a fragment of the end of a pipe shaped as it would be by this tool if the cam plate shown in Fig. 1 is used.

Fig. 10 is a view in elevation of a cam plate having a slot of a different shape from the slot in the cam plate shown in Fig. 1.

Fig. 11 is a sectional view showing a fragment of the end of a pipe shaped as it could be by this tool if the cam plate shown in Fig. 10 is used.

Like reference numerals refer to like parts throughout the several views.

This tenoning tool comprises an externally threaded tubular mounting screw 11 having a turn collar 12 fixedly secured to the end portion thereof which is shown at the left in Figs. 1 and 3. The turn collar 12 is externally provided with radial holes 12' for the reception of a spanner or bar type wrench by which said collar 12 and the mounting screw 11 may be turned. The mounting screw 11 carries a self centering expandable and contractable tool holding device which may be expanded within a pipe to center the tool relative to the pipe and to anchor the tool firmly to the pipe. This tool holding means includes one collar or hub 13 threaded onto the mounting screw 11 for longitudinal movement along the screw 11 by rotation of said screw and two other collars 14 and 15 longitudinally non-movable but rotatively mounted on the screw 11 near the respective ends of said screw. Longitudinal movement of collar 14 on mounting screw 11 is prevented by the turn collar 12 and a set collar 36 which is secured to the screw 11. The collar 15 is restrained against longitudinal movement by a thrust ring 37 and a feed nut 27, 26, hereinafter described. The collar 14, see Figs. 1 and 8, has flanges 14' providing flat bearing surfaces of substantial area for links 16 to contact and abut against. The collars 13 and 15 are provided with similar flat bearing surfaces.

The links 16, preferably four in number, are connected by pivot members 17 with the flanges 14' of the collar 14 and extend outwardly therefrom and a like number of similar links 18 are connected by pivot members 19 with the collar 15. Four longitudinally extending rail bars 20 are pivotally connected by shouldered spacer pins 21 with the outer ends of the links 16 and 18. Four longer links 22 each have an inner end connected by a pivot member 23 with the collar 13 and an outer end connected by a spacer pin type pivot member 21 with one of the rail members 20. The spacer pins 21 connect the rail members or bars 20 at two opposite sides of the mounting screw 11 with each other and thus cooperate in providing a stronger and more stable and efficient tool holding means.

Rotating the mounting screw 11 in the proper direction to move the hub 13 to the left, Figs. 1 and 3, will expand the links 22, 16 and 18 and the rails 20 against the inner wall of any pipe of suitable size within which they are positioned and thus center and firmly anchor the mounting screw within the pipe. Rotating the mounting screw 11 in the proper direction to move the hub 13 to the right, Figs. 1 and 3, will contract parts 22, 20, 16 and 18 and release the tool from the pipe. When the holding means is firmly expanded against the inside wall of a pipe the mounting screw 11 will not turn unless a force tending to turn it is applied by a suitable wrench or lever to the turn collar 12.

A longitudinally and rotatively movable tubular tool carrying feed shaft 24 is disposed partly within and extends entirely through the mounting screw 11. The end portion of the feed shaft 24 shown at the left in Figs. 1 and 3 is slidably and rotatively supported by a bushing 25 which is disposed within the mounting screw 11. The other end portion of said tubular feed shaft 24 extends through a feed nut formed of a smaller internally threaded part 26 and a larger end portion 27 which fits snugly over the adjacent end portion of the mounting screw 11 and is secured thereto by a set screw 28. The feed shaft is rotatively supported in the smaller part 26 of the feed nut.

A longitudinally movable wedge bar 29 is slidably disposed within the end portion of the tubular feed shaft 24 shown at the right in Fig. 3. Said wedge bar 29 is provided with a longitudinally extending groove 30, see also Fig. 5, having an inclined bottom wall 31. A radially movable wedge bar 32 is disposed within the groove 30 in the longitudinally movable wedge bar 29 and rests on the inclined bottom 31 of said groove. The outer edge portion of the radially movable wedge bar 32 extends outwardly through a longitudinally extending slot 34 in the tubular feed shaft 24 and has transverse threads 33 on its outer edge. The threads 33 match with internal threads in the smaller end part 26 of the feed nut and cooperate in providing longitudinal feeding movement of the feed shaft 24. Release springs 35 are provided adjacent the two ends of the radially movable feed bar 32 yieldingly urging said bar 32 inwardly into a position in which the threads 33 on the edge thereof are clear of the internal threads in the part 26 of the feed nut. Bar 32 being in slot 34 is restrained against both longitudinal and rotary movement and this prevents rotary movement of bar 29.

A control rod 38, disposed within the tubular feed shaft 24, is secured to the longitudinally movable wedge bar 29 and extends to the left therefrom, Figs. 1 and 3, through a control rod bushing 41 and out of the end of the feed shaft 24. A hand knob 39 and lock nut 40 are adjustably threaded onto the control rod 38 outwardly from the bushing 41. A stop collar 43 is secured, by a set screw 42 to the control rod 38 within the tubular feed shaft 24 and at a predetermined distance from the bushing 41 to limit movement of the control rod 38 and bar member 29 in one direction. The nut 40 adjacent the bushing 41 limits movement of these parts in the opposite direction. Movement of the bar member 29 to the left, Fig. 3, by exerting a pull on the control rod 38 will cause the springs 35 to disengage the threads 33 of the radially movable wedge bar 32 from the feed nut 26, 27 and movement of said bar member 29 to the right will bring about engagement of these threads.

The end portion of the tubular feed shaft 24 shown at the left in Figs. 1 and 3 has a tool arm support 44 fixedly secured to it. For convenience this tool arm support 44 is shown as a crank but it could be a disc or any outwardly protruding member capable of carrying tool means. The outer end of crank 44 has a handle 45 secured to it. The crank 44 is shown to be of channel shaped cross section and it has a longitudinally extending slot 49 provided in it. A tool carrying arm 46 is adjustably secured to the crank 44 and extends at right angles from said crank and parallel to the mounting screw 11 and feed shaft 24. A gib 50 is rigid with an end of the tool carrying arm 46 and fits slidably in the slot 49 and functions as a key or spline in helping to position the tool carrying arm 46 relative to the crank 44. A stud bolt 47, which is rigid with the tool carrying arm 46 and gib 50, extends through the slot 49 and has a spacer member 51 and nut 47' on it to rigidly but adjustably clamp the tool carrying arm 46 to the crank 44.

The tool carrying arm 46 is preferably a strong metal bar of substantial length and thickness and of approximately rectangular cross section. Said tool carrying arm 46 has a relatively wide but shallow groove 52 extending longitudinally of one side thereof to slidably fit over a cam plate 53 which has a cam slot 54 therein. The cam plate 53 is readily replaceable by other similar cam plates having slots differing in shape from the slot 54. Two thin flat cam plate retainers 55 and 56 are secured by means such as rivets 57 to the grooved face of the tool carrying arm 46 and overhang the edges of the cam plate 53 so that relative longitudinal movement of the tool arm 46 and cam plate 53 can take place as the tool arm 46 is moved longitudinally of the work. The face of the cam plate 53, near one end thereof, has a rigidly attached outwardly protruding perforated guide member 58 through which a template post 59 slidably extends. The post 59 holds the camplate 53 longitudinally immovable while the tool arm 46 is being moved longitudinally. The end of the template post 59 remote from the guide member 58 is secured to a mounting ring 60. The ring 60 is rotatively attached by a retainer disc 61 and set screws 62 to the face of the turn collar 12. Thus the ring 60 is rotatively mounted on but is longitudinally immovable relative to the mounting screw 11 and said post 59 is free to revolve and move angularly with the crank 44 and tool carrying arm 46. However this post 59 will hold the cam plate 53 longitudinally immovable while the tool arm 46 is being moved longitudinally by the feed shaft 24 as said tool arm is revolved about the mounting screw 11.

Preferably the tool arm 46 is provided with three transversely extending cutting tools 63, 64 and 65. The tool 63 is an end facing and grooving tool, the tool 64 is a main tenoning tool, and the tool 65 is a clearance cut or extension cutting tool. Each of these tools can be used independently of the others and normally only one of said tools at a time will be used. When one of these tools is being used the other two tools will ordinarily be retracted. Each of said tools is provided with a cutting tip T of hardened cutting material and of a shape depending on the nature of the cutting to be done.

The main tenoning tool 64, Fig. 4, together with an L-shaped bracket 66 with which it is connected by an adjusting screw 67, are disposed within a transverse groove 68, see also Fig. 7, in the face of the tool carrying arm 46. The screw 67 is threaded into the tool 64 and said screw 67 serves as a fine adjustment means for adjusting the cutting tip of the tool relative to the work and as a tool holding means. The outer end portion of the screw 67 extends rotatively through the flange 69 of bracket 66 and has a knurled head 70 rigid therewith. A collar 71 limits outward movement of the screw 67 in flange 69 and a ball 72 is yieldingly urged by a spring 73 against the head 70 to prevent rotary movement of the screw 67 by vibration. Retainer plates 74 attached to tool arm 46 by screws 57 extend across the bracket 66 above and below the cam plate groove 52 and prevent the bracket 66 from contacting and rubbing against the cam plate 53. The bracket 66 and tool 64 are freely movable in the guideway formed by the groove 68 and retainer plates 74 but are held snugly enough so that the tool and bracket do not vibrate or chatter when in use. A cam follower 76 is rigid with the bracket 66 and operates in the slot 54 of cam plate 53. This cam follower 76 may be a set screw with an externally cylindrical recessed head. As the cam follower 76 moves along the cam slot 54 when the tool is in use it imparts radial movement to the tool and the shape of the cam slot thus determines the shape or contour of the cut made by the tool 64.

The extension or clearance cut tool 65 extends through a transverse groove 77 in the tool carrying arm 46 and is adjustably locked in different desired cutting positions by a set screw 78. Retainer plates 79 hold the tool 65 in the groove 77 clear of the cam plate 53. The extension tool is used to extend a cut beyond the length possible with the main tenoning tool 64. To extend a cut the tool 64 is retracted from the work. The tool carrying parts are moved to the left, Fig. 1, far enough to correctly longitudinally position the tool 65 so it will continue the cut of the main tenoning tool, the tool 65 is radially adjusted for the correct depth of cut and the tool arm is again fed forwardly making an extension cut of uniform depth. Extending a cut beyond the usual distance may be necessary, for instance, in making closures in a line between two pipes which can not be moved longitudinally relative to each other.

The end facing and grooving tool 63 is slidably supported in a guide member 81 on an attachment plate 80 which is secured to the back face of the tool arm, that is the face opposite the cam plate 53, by a set screw 82. The set screw 82 passes through a longitudinal slot 83 and can be threaded into any one of a plurality of threaded holes 84 in the tool carrying arm 46. Thus longitudinal adjustment of the tool 63 over a substantial distance is provided for. Preferably the attachment plate 80 has flanged edge portions 81' which hook over the edges of the tool arm 46 and hold said plate 80 immovable when the screw 82 is tightened. The end of the tool 63 shown uppermost in Figs. 1, 2 and 6 has a transversely offset part 85 through which an adjusting screw 86 extends. A knurled head 87 and a collar 88 are secured to the adjusting screw 86 on opposite sides of the offset part 85 of the tool 63. Preferably ball and spring friction means 89, similar to the previously described devices 72, 73, is used in connection with the knurled head 87. This friction means 89 prevents drifting of the adjusting screw 86 when it is subjected to vibrations. The adjusting screw 86 is threaded through a lug 90 on the guide member 81 so that turning of screw 86 will move the tool 63 toward and away from the work and thus the tool 63 may be manually fed radially relative to the work.

The grooving and end facing done by the tool 63 ordinarily do not require any relative longitudinal movement between the tool and the work and for this reason it is desirable to provide means by which the feed shaft 24 together with the crank 44 and tool arm 46 can be locked against longitudinal movement relative to the mounting screw 11. The means herein disclosed for accomplishing this purpose comprises a block 91 rigid with the crank 44, said block having a hole 92 therein and having a set screw 93 threaded into the block perpendicular to the hole 92 and intersecting said hole. A locking pin 94 rigid with the template post mounting ring 60 extends toward the block 91 and is positioned within the hole 92 when the crank 44 is close to the ring 60. Since rotary movement of the crank 44 and ring 60 is always synchronous the pin 94 will always be aligned with the hole 92. When the set screw 93 is retracted the hole 92 can slidably receive the pin 94 without in any way affecting the operation of the feed screw means. When the wedge block 29 is moved far enough to the left, Fig. 3, to disengage the threads 33 of bar 32 from the threads of feed nut member 26 the crank 44 can be readily moved toward or away from the work to correctly position the facing and grooving tool 63 relative to the work. The set screw 93 can then be tightened against the pin 94 to securely lock the crank 44 and feed shaft 24 and tool arm 46 against movement longitudinally of the mounting screw 11. With the tool 63 adjusted to a desired position and locked against longitudinal movement the crank 44 may be rotated and the tool 63 fed inwardly by manually turning the screw 86 to make the desired face cut or groove.

In the use of the main tenoning tool 64 when a cam plate 53 having a slot shaped like slot 54 is used the end portion of a pipe 95, Fig. 9, will be given a contour substantially as shown in said Fig. 9. Cam plates are readily interchanged in the tool arm 46 by detaching said tool arm from the crank 44 and slots of any desired shape may be provided in these plates. For instance, the cam plate 53' shown in Fig. 10 has a straight but inclined cam slot 96 which makes it possible to impart to the end portion of a pipe 97 the shape or contour shown in Fig. 11.

The foregoing description and accompanying drawings clearly disclose a preferred embodiment of this invention but it will be understood that changes in the same may be made within the scope of the following claims.

I claim:

1. In a pipe tenoning tool, tool mounting means expandable within a pipe into fixed engagement with the pipe; a tubular feed shaft rotatively supported axially of the pipe by said tool mounting means; screw thread means longitudinally moving said tubular feed shaft when said feed shaft is rotated; a crank rigid with said feed shaft; a tool carrying arm rigid with said crank and extending outwardly therefrom; a tool carried by said tool carrying arm and positioned to engage the exterior of a pipe within which the tool mounting means is engaged; a cam slidably disposed within said tool carrying arm and connected with said tool, said cam being capable of moving said tool radially when the tool is longitudinally moved; and cam holding devices attached to said tool mounting means restraining longitudinal movement of said cam.

2. A pipe tenoning tool comprising tool mounting means expandable within a pipe into fixed engagement with the pipe; a tubular feed shaft rotatively supported axially of the pipe by said tool mounting means; disengageable screw threads provided between said feed shaft and said tool mounting means longitudinally moving said tubular feed shaft relative to said tool mounting means when said screw threads are engaged and said feed shaft is rotated; control devices operable in selectively engaging and disengaging said screw threads; a crank rigidly attached to said feed shaft; a tool carrying arm rigid with said crank and extending outwardly therefrom; a tool carried by said tool carrying arm and positioned to engage the exterior of a pipe within which the tool mounting means is secured; a cam carried by and longitudinally movable relative to said tool carrying arm and connected with said tool, said cam moving said tool radially in response to relative longitudinal movement of said cam and said tool arm; and cam holding devices attached to said tool mounting means holding said cam longitudinally immovable relative to the pipe while the tool carrying arm and tool are revolved around the pipe.

3. A pipe tenoning tool comprising tool mounting means expandable within a pipe into fixed engagement with the pipe; a tubular feed shaft rotatively supported axially of the pipe by said tool mounting means, tool feeding means longitudinally moving said feed shaft relative to said tool mounting means when said feed shaft is rotated; tool carrying means attached to said feed shaft including a tool carrying arm radially spaced outwardly from the feed shaft; a tool movably supported by said tool carrying arm and positioned to engage the exterior of the pipe; a cam plate carried by and longitudinally movable relative to said tool carrying arm, said cam plate having a cam slot; a cam follower on said tool operating in said cam slot moving said tool radially in response to longitudinal movement of the tool carrying arm relative to the cam plate; and a template post attached to said tool mounting means and rotatable with said tool carrying arm holding said cam plate longitudinally immovable relative to the tool mounting means.

4. A pipe tenoning tool comprising a tubular mounting screw; expandable means carried by said mounting screw centering and rigidly supporting said mounting screw within a pipe when it is expanded within the pipe, a tubular feed shaft rotatively supported coaxially of said mounting screw; tool feeding means longitudinally moving said feed shaft relative to said mounting screw when said feed shaft is rotated; a tool carrying arm connected with said feed shaft and spaced radially from said feed shaft and movable rotatively and longitudinally with said feed shaft; a tool movably carried by said tool carrying arm and positioned to engage the exterior of a pipe within which said mounting screw is supported; a cam movably carried by said tool carrying arm and connected with said tool providing radial movement of the tool as said tool is moved longitudinally of the work; and cam holding devices attached to said mounting screw holding said cam longitudinally immovable relative to the tool carrying arm.

5. A pipe tenoning tool comprising a tubular mounting screw; expandable means carried by said mounting screw centering and rigidly supporting said mounting screw within a pipe when it is expanded within a pipe; a tubular feed shaft rotatively supported coaxially within said mounting screw and extending outwardly from both ends of said mounting screw, said feed shaft having a longitudinally extending slot; a longitudinaly movable wedge bar and a radially movable wedge bar disposed within said feed shaft and having longitudinally inclined coacting surfaces, the radially movable wedge bar having a threaded portion movable in the slot in said feed shaft; a feed nut extending around the slotted portion of said feed shaft and secured to said mounting screw and having internal threads engageable by the threads of said radially movable wedge bar; control means operable in moving the longitudinally movable wedge bar in engaging and disengaging the threads of said radially movable wedge bar and said feed nut; a tool carrying arm connected with said feed shaft and spaced radially from said feed shaft and movable rotatively and longitudinally with said feed shaft; a tool movably carried by said tool carrying arm and positioned to engage the exterior of a pipe within which said mounting screw is supported; a cam movably carried by said tool carrying arm and connected with said tool providing radial movement of the tool as said tool is moved longitudinally of the work; and cam holding devices attached to said mounting screw holding said cam longitudinally immovable relative to the tool carrying arm.

6. A pipe tenoning tool comprising a tubular mounting screw; expandable means carried by said mounting screw centering and rigidly supporting said mounting screw within a pipe; a tubular feed shaft rotatively supported coaxially of said mounting screw; disengageable tool feeding means capable when engaged of longitudinally moving said feed shaft relative to said mounting screw when said feed shaft is rotated; devices operable to selectively engage or disengage said tool feeding means; a tool arm support rigid with said feed shaft and extending radially therefrom; a tool arm connected with said tool arm support and spaced radially from said feed shaft and movable rotatively and longitudinally with said feed shaft; a tool movably carried by said tool arm and positioned to engage the exterior of a pipe within which said mounting screw is supported; a cam movably carried by said tool arm and connected with said tool providing radial movement of the tool as said tool is moved longitudinally; and cam holding devices attached to said mounting screw holding said cam longitudinally immovable relative to the tool arm.

7. The apparatus as claimed in claim 7 in which locking devices capable of locking the feed screw and tool arm support and tool arm against longitudinal movement are provided for use when the tool feeding means is disengaged.

8. The apparatus as claimed in claim 7 in which an additional grooving and facing tool is radially adjustably mounted on said tool arm and locking devices capable of locking the feed screw and tool arm support against longitudinal movement are provided for holding the tool arm when said grooving and facing tool is used.

9. The apparatus as claimed in claim 6 in which the tool arm support and the mounting screw have relatively telescopic parts and a set screw is provided for clamping said relatively telescopic parts in locking the feed screw and tool arm support and tool arm against longitudinal movement relative to the mounting screw.

10. A pipe tenoning tool comprising a tubular mounting screw; expandable means carried by said mounting screw centering and rigidly supporting said mounting screw within a pipe; a tubular feed shaft rotatively supported coaxially within said mounting screw and extending outwardly from both ends thereof and having a longitudinally extending slot therein; a longitudinally movable wedge bar slidably disposed within said feed shaft and having a longitudinal groove provided with an inclined bottom; a radially movable wedge bar positioned within the groove in said longitudinally movable wedge bar and the slot in said feed shaft, said radially movable wedge bar having an inclined edge engaging the inclined bottom of said groove and having a threaded edge portion guided and supported in the slot in said feed shaft and capable of having its threads protrude beyond the periphery of said feed shaft; springs urging said radially movable wedge bar into said feed shaft; a feed nut secured to said mounting screw and having internal threads cooperating with the threads of said radially movable wedge bar when said radially moveable wedge bar is moved outwardly; a control rod operable in moving said longitudinally movable wedge bar; a tool arm support attached to said feed shaft; a tool arm carried by said tool arm support; a tool movably carried by said tool arm; a cam movably carried by said tool arm and connected with said tool providing radial movement of the tool as the tool is longitudinally moved; and cam holding devices attached to said mounting screw holding said cam longitudinally immovable.

References Cited in the file of this patent

UNITED STATES PATENTS

| 1,677,131 | Cole et al. | July 17, 1928 |
| 1,678,924 | Strindberg | July 31, 1928 |
| 2,537,916 | Rosenboom | Jan. 9, 1951 |
| 2,670,525 | Miller | Mar. 2, 1954 |